(12) United States Patent
Yonezawa

(10) Patent No.: US 8,947,541 B2
(45) Date of Patent: Feb. 3, 2015

(54) LENS APPARATUS CONTROLLABLE VIA MULTIPLE CONTROL SOURCES AND IMAGE PICKUP SYSTEM INCLUDING THE LENS APPARATUS

(75) Inventor: Takeshi Yonezawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/435,044

(22) Filed: Mar. 30, 2012

(65) Prior Publication Data

US 2012/0249809 A1    Oct. 4, 2012

(30) Foreign Application Priority Data

Mar. 31, 2011    (JP) .................................. 2011-077651

(51) Int. Cl.
| | |
|---|---|
| H04N 5/225 | (2006.01) |
| H04N 5/228 | (2006.01) |
| G02B 13/16 | (2006.01) |
| H04N 5/232 | (2006.01) |
| H04N 13/02 | (2006.01) |

(52) U.S. Cl.
CPC ....... H04N 13/0239 (2013.01); H04N 5/23296 (2013.01); H04N 5/23212 (2013.01); H04N 13/0296 (2013.01)
USPC .................... 348/207.1; 348/335; 348/208.12

(58) Field of Classification Search
CPC .......... H04N 13/0296; H04N 5/23203; H04N 5/343; H04N 13/0447; H04N 5/2254; H04N 5/23212; H04N 5/23296; G03B 13/32
USPC .......... 348/207.1, 335, 208.12, 42, 47, 49, 48
See application file for complete search history.

(56) References Cited

U.S. PATENT DOCUMENTS

| | | | | |
|---|---|---|---|---|
| 6,466,378 | B2 * | 10/2002 | Kaneko et al. ................. | 359/697 |
| 7,738,016 | B2 * | 6/2010 | Toyofuku ................... | 348/240.1 |
| 8,351,131 | B2 * | 1/2013 | Kato ............................. | 359/698 |
| 2011/0176795 | A1 * | 7/2011 | Won et al. ..................... | 396/133 |

FOREIGN PATENT DOCUMENTS

| | | |
|---|---|---|
| JP | 09-127400 A | 5/1997 |
| JP | 2008-154073 A | 7/2008 |
| JP | 2009094724 A | 4/2009 |

OTHER PUBLICATIONS

Official Action issued in JP2011-077651 mailed Nov. 20, 2014.

* cited by examiner

*Primary Examiner* — Twyler Haskins
*Assistant Examiner* — Padma Haliyur
(74) *Attorney, Agent, or Firm* — Rossi, Kimms & McDowell LLP

(57) ABSTRACT

A lens apparatus includes: a switch for switching between single and plural modes for using lens apparatus singularly and plurally, respectively; a communication unit to communicate with external device; a unit to set all elements to first state in single mode and set the respective elements to second or third state in plural mode; a control source output unit to output, for each state of the elements, control source information for determining a control command to drive the element; and a unit to determine a command for controlling drive of the elements based on the control source information determined by the control source output portion, wherein in the second state, control commands for corresponding elements are output to other lens apparatuses through the communication unit, and in the third state, the control source output portion outputs control source information different from that in the first and second states.

6 Claims, 10 Drawing Sheets

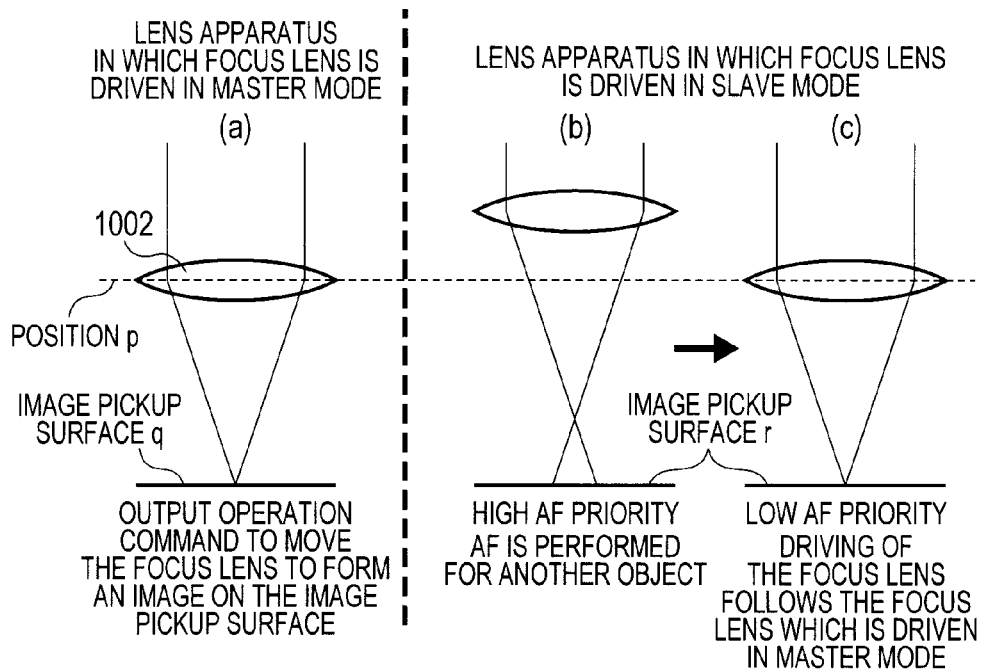
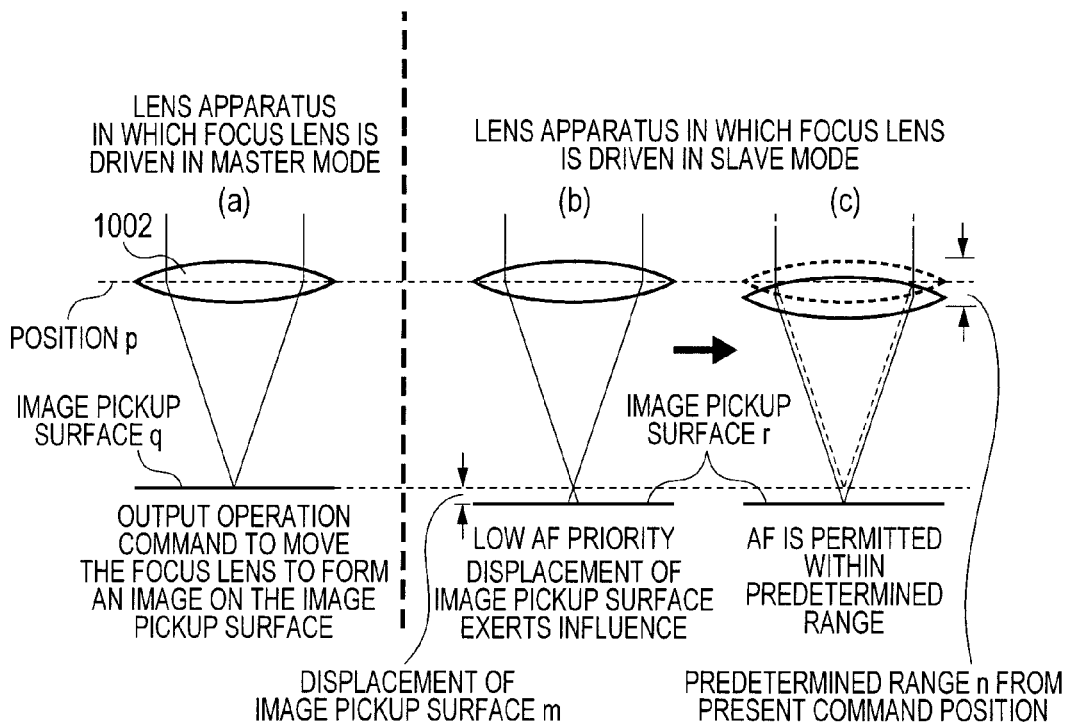

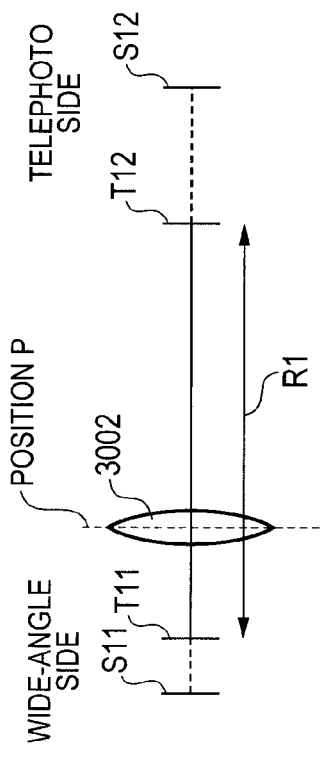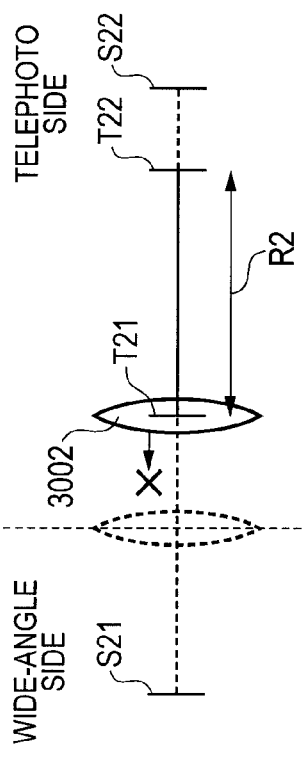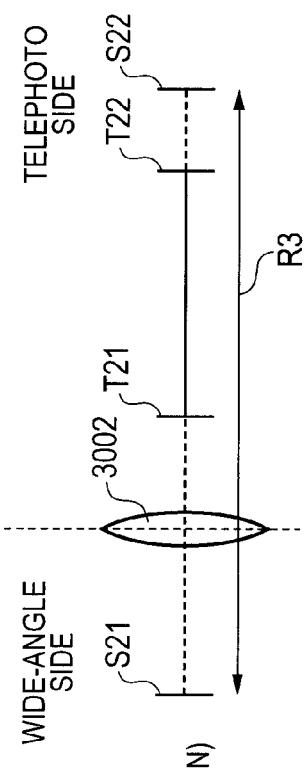
FIG. 10A DRIVE RANGE OF ZOOM LENS IN LENS APPARATUS IN WHICH THE ZOOM LENS IS DRIVEN IN MASTER MODE
FIG. 10B DRIVE RANGE OF ZOOM LENS IN LENS APPARATUS IN WHICH THE ZOOM LENS IS DRIVEN IN SLAVE MODE (PRIOR ART)
FIG. 10C DRIVE RANGE OF ZOOM LENS IN LENS APPARATUS IN WHICH THE ZOOM LENS IS DRIVEN IN SLAVE MODE (PRESENT INVENTION)

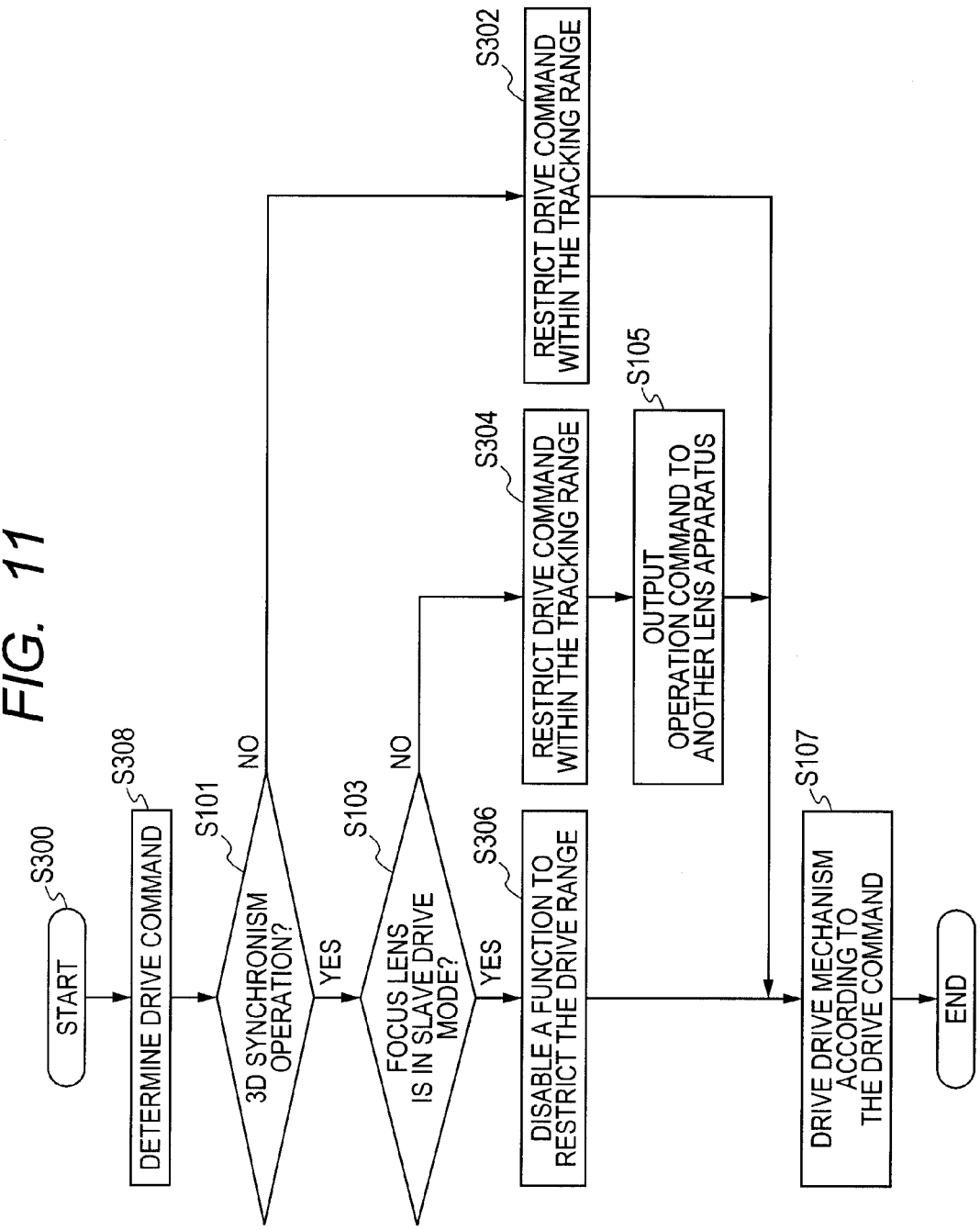

LENS APPARATUS CONTROLLABLE VIA MULTIPLE CONTROL SOURCES AND IMAGE PICKUP SYSTEM INCLUDING THE LENS APPARATUS

BACKGROUND OF THE INVENTION

1. Field of the Invention

The present invention relates to a lens apparatus and an image pickup system including the lens apparatus, and particularly, to an operation of a plurality of image pickup systems such as in stereography.

2. Description of the Related Art

Conventionally, there is a known stereography system in which a plurality of image pickup systems where each of the plurality of image pickup systems can be used singularly are used to perform stereography. Meanwhile, in the stereography, just a slight displacement between left and right images may give the viewer not only a feeling of strangeness, but also a feeling of discomfort and fatigue. Therefore, in the stereography system, positions of corresponding optical elements that can be driven in the respective image pickup systems always need to be equalized between the plurality of image pickup systems. In a conventional system, the following technique is known as a method of always equalizing the positions of the corresponding optical elements that can be driven in the respective plurality of image pickup systems.

For example, Japanese Patent Application Laid-Open No. H09-127400 discloses a drive apparatus in which one of two zoom lenses is set to a master side, the other is set to a slave side, and the lens on the slave side is driven in accordance with the movement of the lens on the master side.

Japanese Patent Application Laid-Open No. 2008-154073 discloses an image pickup system that can match the settings of a plurality of image pickup apparatuses. According to the proposal, settings are changed in synchronization with the timing of changing the setting by another image pickup apparatus. Therefore, the settings of the image pickup apparatuses can be appropriately changed during the operation of the plurality of image pickup apparatuses.

However, the prior art disclosed in Japanese Patent Application Laid-Open No. H09-127400 does not particularly describe controls other than the control for causing the lens on the slave side to follow the lens on the master side, and particularly, does not describe a case in which there is a control from an automatic drive function included in the image pickup system. Furthermore, the lens on the slave side cannot follow due to functions set in the image pickup system on the slave side, and this is not taken into account.

In fact, if a function of limiting the drive range or the maximum speed is enabled in the image pickup system on the slave side, the lens on the slave side cannot completely follow the movement of the lens on the master side.

If setting information related to the functions of the image pickup systems is synchronized in the prior art disclosed in Japanese Patent Application Laid-Open No. 2008-154073, the image pickup system on the master side and the image pickup system on the slave side have the same settings. More specifically, separate settings are necessary for optimal settings of the image pickup systems.

SUMMARY OF THE INVENTION

An object of the present invention is to provide an image pickup system that can be operated singularly, in which switch to optimal settings is possible both in an image pickup system on a master side and an image pickup system on a slave side in an operation as a stereography system.

To attain the object, the present invention provides a lens apparatus including optical elements that can be driven in accordance with control commands from a plurality of control sources, the lens apparatus including: a mode switching unit configured to switch between a single mode in which the lens apparatus is used singularly and a plural mode in which the lens apparatus is used plurally; a communication unit configured to communicate with an external device; a driving state setting unit configured to set all of the optical elements to a first driving state in the single mode and set each of the optical elements to one of a second driving state and a third driving state in the plural mode; a driving state identification unit configured to identify the driving state set to each of the optical elements; a control source information output unit configured to output, for each driving state of each of the optical elements, control source information for determining a control command to be followed to drive the optical element among control commands from the plurality of control sources; and a command determination unit configured to determine a command for controlling drive of the optical elements based on the control source information determined by the control source information output unit, wherein in the second driving state, control commands for corresponding optical elements are output to other lens apparatuses through the communication unit, and in the third driving state, the control source information output unit outputs control source information different from the control source information in the first driving state and the second driving state.

According to the present invention, an image pickup system that can be operated singularly can be provided, in which switch to optimal settings is possible both in an image pickup system on a master side and an image pickup system on a slave side in an operation as a stereography system.

Further features of the present invention will become apparent from the following description of exemplary embodiments with reference to the attached drawings.

BRIEF DESCRIPTION OF THE DRAWINGS

FIG. 3 is a diagram illustrating an operation of an AF function when a priority table 1 is used.

FIG. 4 is a diagram illustrating an operation of the AF function when a priority table 2 is used.

FIGS. 10A, 10B and 10C are diagrams illustrating an advantageous effect in the third embodiment.

FIG. 11 is a flow chart of the third embodiment.

DESCRIPTION OF THE EMBODIMENTS

Hereinafter, exemplary embodiments of the present invention will be described in detail based on the attached drawings.

First Embodiment

Figure 1:
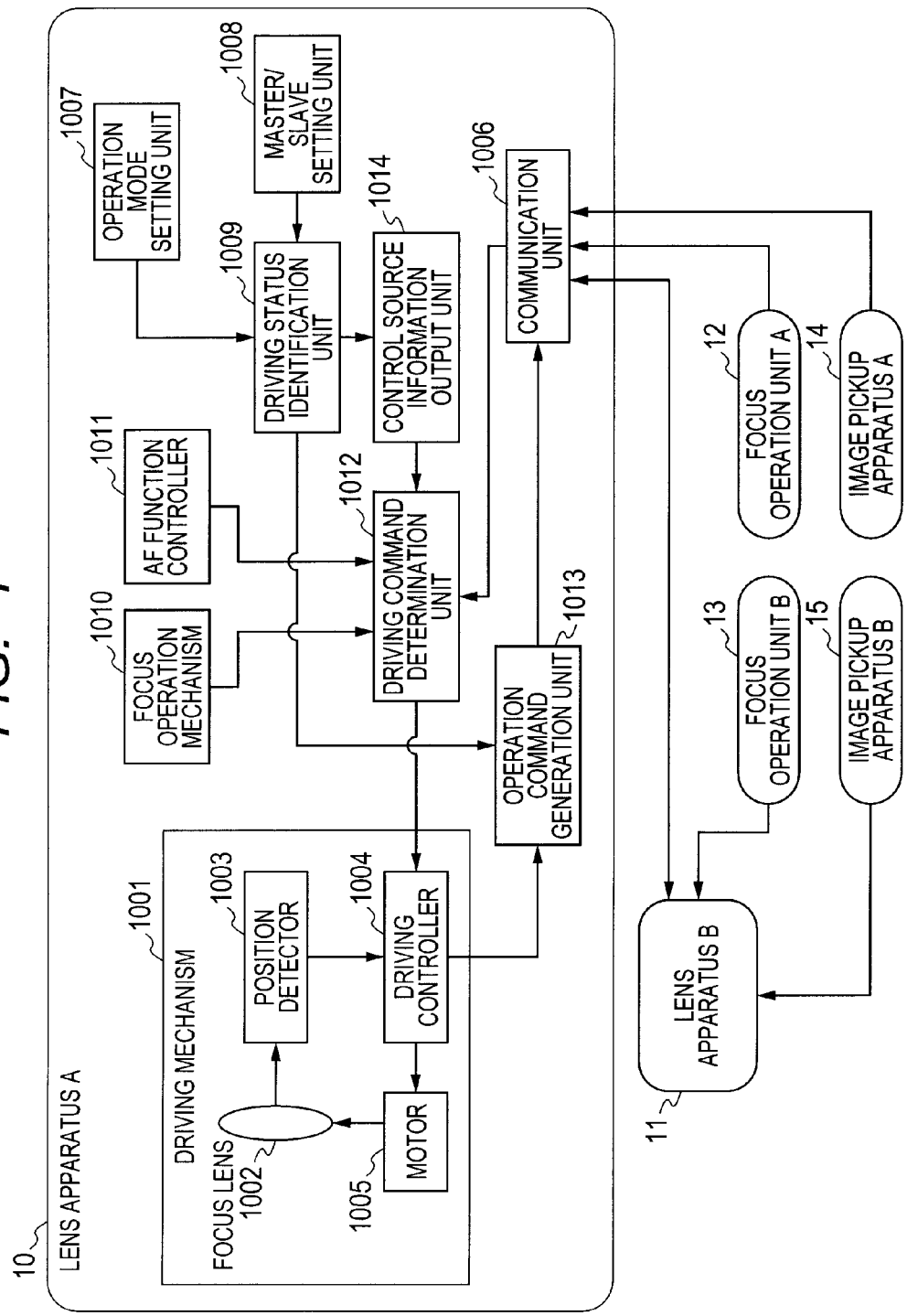
FIG. 1 is a configuration block diagram of a first embodiment.

FIG. 1 is a configuration block diagram of an image pickup system according to a first embodiment of the present invention.

The image pickup system of the present invention includes a lens apparatus A10 and a lens apparatus B11 with the same configuration. The lens apparatuses are operated in an operation mode which is one of a stand-alone operation mode (single mode) for stand-alone operation and a 3D synchronized operation mode (plural mode) for connecting the lens apparatuses for mutual communications to perform a synchronized operation of optical elements.

In the 3D synchronized operation mode, the optical elements included in the lens apparatuses are set to master (second driving state) or slave (third driving state) in the drive. The lens apparatus including the optical element in the master driving state outputs, to the other lens apparatus, an operation command for synchronized drive of the optimal unit. The lens apparatus including the optical element in the slave driving state drives the optical element based on the operation command of the optical element from the other lens apparatus. In the lens apparatuses in the stand-alone operation mode, all optical elements are driven in a single driving state (first driving state) in which synchronized drive with the optical elements of the other lens apparatus is not performed.

As illustrated in Table 1, one of the stand-alone operation mode and the 3D synchronized operation mode is set for the operation mode of each lens apparatus, and one of the stand-alone drive state, the master drive state, and the slave drive state is set as the driving state of each optical element included in the lens apparatus.

TABLE 1

| Operation Mode | | Stand-Alone Operation Mode | 3D Synchronized Operation Mode | |
|---|---|---|---|---|
| | Optical element | Lens Apparatus X | Lens Apparatus Y | Lens Apparatus Z |
| Driving State | Focus | Stand-Alone Drive State | Master Drive State | Slave Drive State |
| | Zoom | Stand-Alone Drive State | Slave Drive State | Master Drive State |
| | Iris | Stand-Alone Drive State | Master Drive State | Slave Drive State |
| | ... | ... | ... | ... |

The block diagram of FIG. 1 will be described.

Hereinafter, an embodiment when the optical element is a focus lens will be described.

A focus operation unit A12 provides a focus operation command to the lens apparatus A10, and a focus operation unit B13 provides a focus operation command to the lens apparatus B11.

An image pickup apparatus A14 and an image pickup apparatus B15, such as cameras, are connected to the lens apparatus A10 and the lens apparatus B11, respectively.

An internal configuration of the lens apparatus A10 will be described.

The lens apparatus A10 includes a focus lens 1002 as an optical element, and a motor 1005 drives the focus lens 1002 forward and backward in an optical axis direction. A position detector 1003 detects the position of the focus lens 1002. A driving controller 1004 calculates an amount of drive of the motor 1005 based on a driving command from a driving command determination unit 1012 described later and a position signal from the position detector 1003. The driving controller 1004 outputs a drive current corresponding to the amount of drive to the motor 1005.

The focus lens 1002, the motor 1005, the position detector 1003, and the driving controller 1004 constitute a driving mechanism 1001.

An operation mode setting unit 1007 (mode switching unit) is a unit that sets the operation mode of the lens apparatus A10 to the stand-alone operation mode or the 3D synchronized operation mode and is constituted by a user interface unit including, for example, a switch or a switch and a display. A master/slave setting unit 1008 (driving state setting unit) is a unit that sets the driving state of one of the master drive state and the slave drive state for each optical element in the lens apparatus and is constituted by a user interface unit including, for example, a switch and a display.

A driving state identification unit 1009 is a unit that identifies which mode the driving state of each optical element is set, stand-alone drive state, master drive state, or slave drive state. If the operation mode setting unit 1007 sets the stand-alone operation mode, the driving state identification unit 1009 identifies that the stand-alone drive state is set to all optical elements. If the operation mode setting unit 1007 sets the 3D synchronized operation mode, the driving state identification unit 1009 identifies that the master drive state is set if the master/slave setting unit 1008 sets the optical element (focus lens here) to the master drive state and identifies that the slave drive state is set if the master/slave setting unit 1008 sets the optical element to the slave drive state. The driving state identification unit 1009 also identifies whether the lens apparatus is set to the stand-alone operation mode or the 3D synchronized operation mode based on the setting by the operation mode setting unit 1007.

In accordance with the driving state, a control source information output unit 1014 determines control source information related to which control command the optical element is to follow to be driven and outputs the information to the driving command determination unit 1012. A method of determining the control source information will be described later.

The lens apparatus A10 communicates with external devices, such as the focus operation unit A12, the image pickup apparatus A14, and the lens apparatus B11, through a communication unit 1006. A focus operation mechanism 1010 included in the lens apparatus A10 is a mechanism for operating the focus and has a configuration such as a focus knob. An AF function controller 1011 generates an operation command of the focus lens 1002 based on an automatic focusing function (hereinafter, "AF function").

The driving command determination unit 1012 is a unit that converts an operation command from the outside of the lens apparatus A10 or from the inside of the lens apparatus A10 to a driving command for driving the focus lens 1002 based on the control source information. Examples of the operation commands from the outside include operation commands from the focus operation unit A12, the image pickup apparatus A14, the lens apparatus B11, and controllers such as a PC and other demands. The driving command determination unit 1012 receives the operation commands through the communication unit 1006. Examples of the operation commands from the inside include an operation command from the focus operation mechanism 1010 and an operation command from a function, such as the AF function controller 1011, included in the lens apparatus that automatically drives the focus lens 1002.

An operation command generation unit 1013 generates, in the 3D synchronized operation mode, an operation command for synchronizing and controlling the focus lens of another lens apparatus and outputs the operation command to the other lens apparatus. Information of the driving command of the focus lens included in the driving controller 1004 and position information of the present focus lens 1002 detected by the position detector 1003 are used to generate the operation command.

Figure 2:
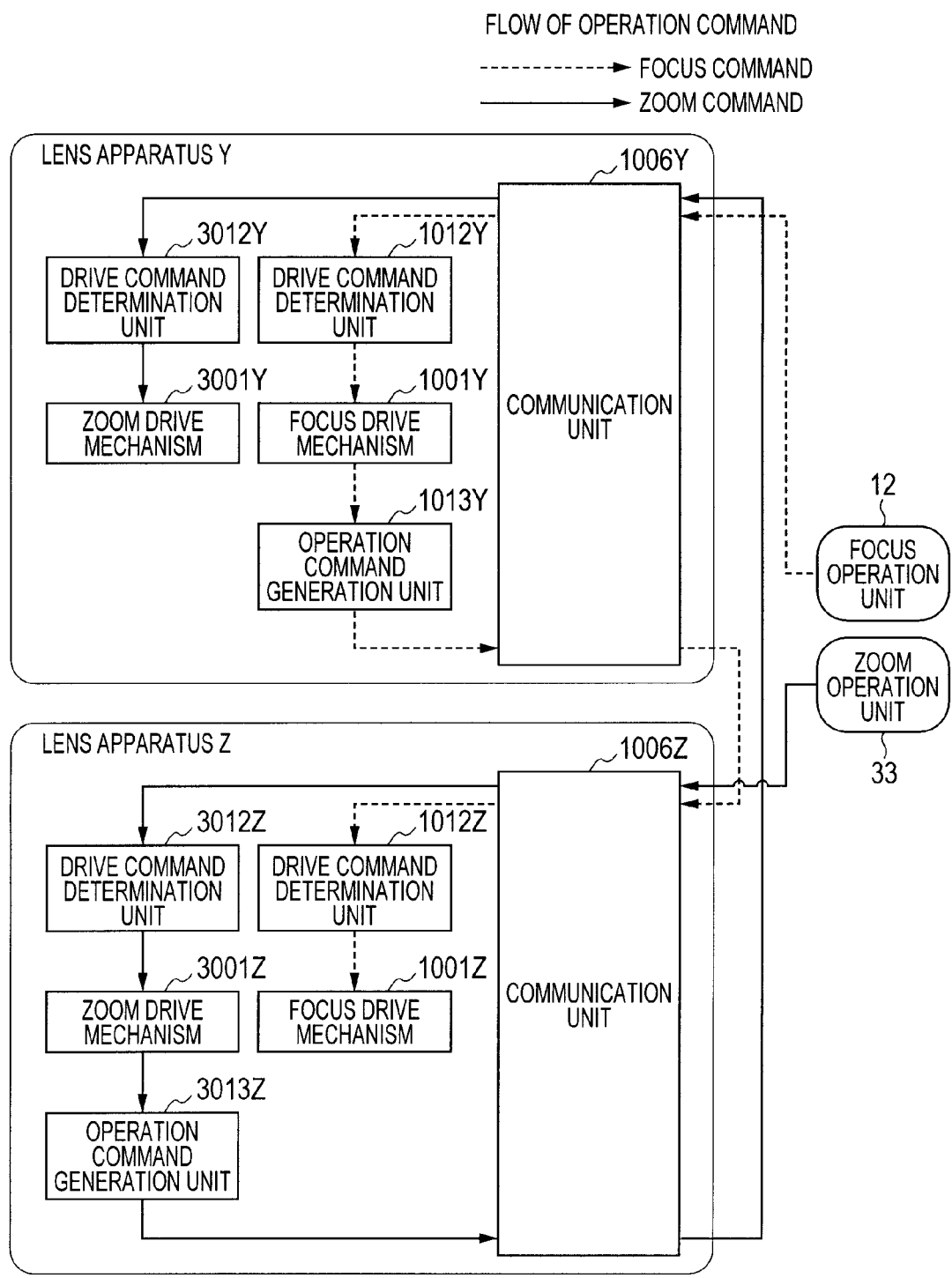
FIG. 2 is a diagram illustrating configurations in lens apparatuses and flows of commands.

FIG. 2 will be used to describe flows of operation commands of two lens apparatuses in the 3D synchronized operation mode in relation to actual movements in the operation mode and the driving state. Although the lens apparatuses of FIG. 2 have the same configurations as the lens apparatuses of FIG. 1, the configurations are simplified for the description. A lens apparatus Y and a lens apparatus Z are connected through a relay cable, and the driving state illustrated in Table 1 is set. In relation to the focus lens, the lens apparatus Y is set to the master, and the lens apparatus Z is set to the slave. In relation to the zoom lens, the lens apparatus Y is set to the slave, and the lens apparatus Z is set to the master. Although the focus lens and the zoom lens will be described, the same applies to the other optical elements.

The focus operation unit 12 first outputs a focus operation command.

When the focus operation command is input to the lens apparatus Y, the focus operation command is transmitted to a driving command determination unit 1012Y through a communication unit 1006Y. The driving command determination unit 1012Y determines a driving command based on the received operation command and transmits the driving command to a focus driving mechanism 1001Y.

The focus driving mechanism 1001Y calculates the actual amount of drive and drives the focus lens based on the driving command. Since the focus lens of the lens apparatus Y is in the master driving state, an operation command generation unit 1013Y generates an operation command for synchronizing and controlling the other lens apparatus and outputs the operation command to the communication unit 1006Y. The information of the driving command and the position information of the focus lens from the focus driving mechanism 1001Y are used to generate the operation command.

The lens apparatus Y and the lens apparatus Z perform synchronized operations through the relay cable. Therefore, the communication unit 1006Y of the lens apparatus Y outputs the operation command output from the operation command generation unit 1013Y, and the operation command is input to a communication unit 1006Z of the lens apparatus Z through the relay cable between the lens apparatuses. When the focus operation command is input to the lens apparatus Z, the focus operation command is transmitted to a driving command determination unit 1012Z through the communication unit 1006Z. The driving command determination unit 1012Z determines a driving command based on the received operation command and transmits the operation command to a focus driving mechanism 1001Z. The focus driving mechanism 1001Z calculates the actual amount of drive and drives the focus lens based on the driving command.

Similarly, a zoom operation unit 33 outputs a zoom operation command.

When the zoom operation command is input to the lens apparatus Z, the zoom operation command is transmitted to a driving command determination unit 3012Z through the communication unit 1006Z. The driving command determination unit 3012Z determines a driving command based on the received operation command and transmits the driving command to a zoom driving mechanism 3001Z. The zoom driving mechanism 3001Z calculates the actual amount of drive and drives the zoom lens based on the driving command. The zoom lens of the lens apparatus Z is in the master driving state. Therefore, an operation command generation unit 3013Z generates an operation command for synchronizing and controlling the other lens apparatus and outputs the operation command to the communication unit 1006Z. The information of the driving command and the position information of the zoom lens from the zoom driving mechanism 3001Z are used to generate the operation command.

The lens apparatus Y and the lens apparatus Z perform synchronized operations through the relay cable. Therefore, the communication unit 1006Z of the lens apparatus Z outputs the operation command output from the operation command generation unit 3013Z, and the operation command is input to the communication unit 1006Y of the lens apparatus Y through the relay cable between the lens apparatuses. When the zoom operation command is input to the lens apparatus Y, the zoom operation command is transmitted to a driving command determination unit 3012Y through the communication unit 1006Y. The driving command determination unit 3012Y determines a driving command based on the received operation command and transmits the driving command to a zoom driving mechanism 3001Y. The zoom driving mechanism 3001Y calculates the actual amount of drive and drives the zoom lens based on the driving command.

A method of determining the control source information by the driving command determination unit 1012 will be described. In the present embodiment, the control source information is a priority table of the operation commands of the control sources. Among the presently enabled operation commands of the control sources, the driving command determination unit 1012 preferentially selects an operation command with a high priority as a driving command, in accordance with the priorities defined in the priority table.

Table 2 illustrates the priority table indicating the priority order in the stand-alone drive state, the master drive state, and the slave drive state.

TABLE 2

| Priority Order | Driving State | |
|---|---|---|
| | Single or Master Drive State | Slave Drive State |
| High ↑ ↓ Low | Camera Demand AF Function | Other Lens Camera Demand AF Function |

The priority orders in the stand-alone drive state and the master drive state are the same. The priorities of the operation commands from the other lens apparatus can be lowered to drive the lens apparatus based on operations from the camera, the demand, and the AF function. In the slave drive state, the highest priority can be provided to the operation commands from the other lens apparatus to drive the lens apparatus by prioritizing the operation commands from the other (focus lens is set to the master) lens apparatus over the operations based on the camera, the demand, and the AF function of the lens apparatus in which the focus lens is set to the slave. In this way, the focus lens of the lens apparatus driven in slave can be driven in synchronization with the focus lens of the lens apparatus driven in master.

FIG. 3 is a diagram illustrating a movement of the focus lens 1002 illustrated in FIG. 1 in the 3D synchronized operation mode during the execution of AF. A position p denotes a position of the focus lens 1002 of the lens apparatus in which the focus is set to the master drive state, and the lens apparatus of the master drive outputs, to the other lens apparatus, an operation command for driving the focus lens to the position p. An image pickup surface q denotes an image pickup surface of the image pickup apparatus connected to the lens apparatus in which the focus lens is set to the master drive state, and an image pickup surface r denotes an image pickup surface of the image pickup apparatus connected to the lens apparatus in which the focus lens is set to the slave drive state. (a) in FIG. 3 illustrates a state of the focus lens in the lens apparatus in which the focus is set to the master drive state. (b) in FIG. 3 illustrates a state of the focus lens of the lens apparatus in which the focus is set to the slave drive state, and the priority of the operation command from the AF function is higher than the priority of the operation command from the other lens apparatus (case of the priority order of the driving command for the same focus as in the stand-alone drive state (master drive state)). (c) in FIG. 3 illustrates a state of the focus lens of the lens apparatus in which the focus is set to the slave drive state, and the priority of the operation command from the AF function is lower than the operation command from the other lens apparatus, as in the present embodiment.

When the priority of the operation command from the AF function in the lens apparatus in which the focus is set to the slave drive state is higher than the priority of the operation command from the other lens apparatus, the focus lens of the lens apparatus driven in slave is driven to a position different from the position p as illustrated in (b) in FIG. 3 if the objects detected by the AF functions of the respective lens apparatuses are different. Therefore, the priority of the command from the AF function of the lens can be set lower than the priority of the operation command from the other lens apparatus to drive, the focus lens of the lens apparatus in which the focus is set to the slave is driven to the position p as illustrated in (c) in FIG. 3.

This allows synchronized drive of the focus lenses of the master drive state and the slave drive state.

TABLE 3

| Priority Order | Slave Drive State |
|---|---|
| High | Other Lens: Operation Command<br>AF: AF Within Predetermined Range From Command Position |
| ↑ | Other Lens: Termination Command Camera |
| ↓ | Demand: Operation Command<br>AF: Normal AF |
| Low | Demand: Termination Command |

Table 3 illustrates a priority table that allows the AF functions to locate the focus positions on the image pickup surfaces of the image pickup apparatuses connected to the lens apparatuses.

The table is characterized in that the priority of the "operation command from the AF function within a predetermined range n from the present command position" is set higher than the priority of the "termination command of the other lens apparatus". The range n will be described later. The operation command denotes a command when the difference between an indicated value of the command signal and the present position of the movable portion of the lens apparatus is greater than a predetermined value. The termination command denotes a command when the difference between the indicated value of the command signal and the current position is zero or within a predetermined range.

A method of using the priority table to allow the AF functions to locate the focus positions to the image pickup surfaces of the image pickup apparatuses connected to the lens apparatuses will be described with reference to FIG. 4. The focus lens 1002, the position p, the image pickup surface q of the image pickup apparatus connected with the lens apparatus in which the focus is set to the master, the image pickup surface r of the image pickup apparatus connected with the lens apparatus in which the focus is set to the slave, and the state (a) of the drive position of the focus lens of the lens apparatus in which the focus is set to the master are the same as in FIG. 3. In general, there is a case where the positions of the image pickup surface q and the image pickup surface r are displace from each other due to variations in manufacturing errors of the lens apparatuses and the image pickup apparatuses, and FIG. 4 illustrates a displacement m of the image pickup surfaces. The range n is a drive range of the focus lens where the priority provided to the operation command from the AF function is high in the lens apparatus in which the focus is set to the slave. The range n is a drive range of the focus lens of the lens apparatus in which the focus around the position p (position of the focus operation command from the lens apparatus in which the focus is the master) is the slave, and the range n has a width that can absorb the displacement m of the image pickup surface. For example, n can be obtained by calculating the amount of the maximum displacement of the image pickup surface. The function selects an object to be focused within the range n to drive the focus lens 1002.

(b) and (c) in FIG. 4 illustrate a state of the focus lens of the lens apparatus in which the focus is the slave under the condition in which there is the displacement m of the image pickup surfaces between the image pickup surface q and the image pickup surface r. As in (c) in FIG. 3, (b) in FIG. 4 illustrates a state of the focus lens when the priority of the operation command from the AF function is lower than the operation command from the other lens apparatus. The priority table used here is the table illustrated in Table 2. (c) in FIG. 4 illustrates a state of the focus lens when the priority of the operation command from the AF function within the predetermined range from the present command position is higher than the termination command of the other lens apparatus. The priority table used here is the table illustrated in Table 3. (b) in FIG. 4, although the focus lenses 1002 of the lens apparatuses can be driven to the same position, the focus is slightly displaced due to, for example, the displacement of the positions of the image pickup surfaces of the lens apparatuses. Meanwhile, the priority table of Table 3 can be used to set the priority higher than the termination command of the other lens apparatus only in the focus drive through the AF function within the predetermined range n from the present command position (position p) among the operation commands of AF as illustrated in (c) in FIG. 4. As a result, the displacement of the focus due to the displacement of the image pickup surfaces can be compensated.

In this way, highly accurate AF can be performed without losing the synchronized drive of the master and the slave.

Figure 5:
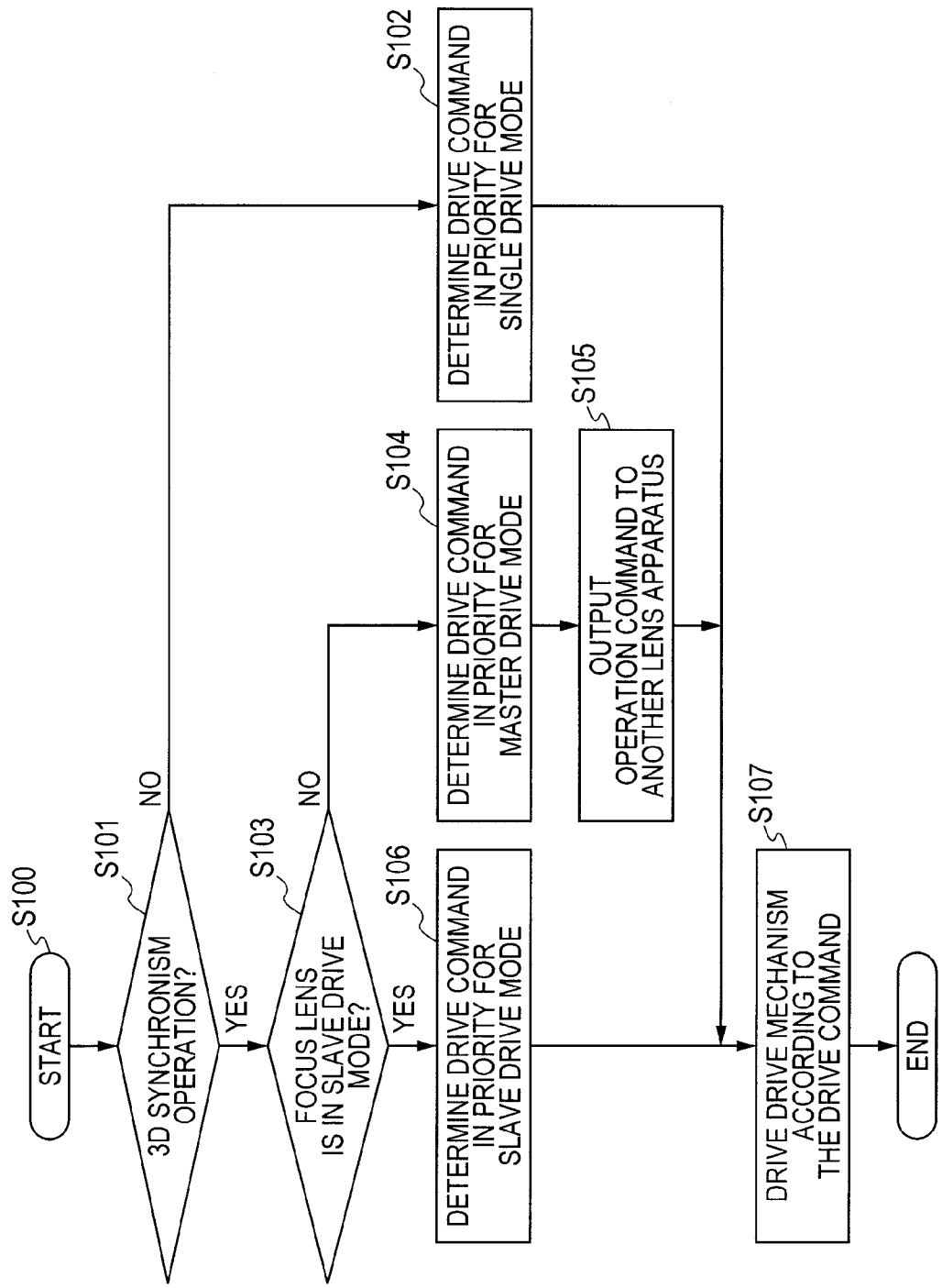
FIG. 5 is a flow chart of the first embodiment.

In the configuration of FIG. 1, the drive of the focus lens 1002 is processed in accordance with a processing flow illustrated in FIG. 5.

The process is started in step S100. In step S101, the driving state identification unit 1009 identifies whether the mode is the 3D synchronized operation mode. If the mode is the stand-alone operation mode, the process proceeds to step S102. If the mode is the 3D synchronized operation mode, the process proceeds to step S103. In step S102, the control source information output unit 1014 outputs the priority table for single driving state as the control source information, and the driving command determination unit 1012 determines the driving command based on the information. The process proceeds to step S107.

Meanwhile, in step S103, the driving state identification unit 1009 identifies whether the focus is in the slave driving state. If the focus is in the master driving state, the process proceeds to step S104. If the focus is in the slave driving state, the process proceeds to step S106. In step S104, the control source information output unit 1014 outputs the priority table for master driving state as the control source information, and the driving command determination unit 1012 determines the driving command based on the information. The process proceeds to step S105. In step S105, the operation command generation unit 1013 generates and outputs an operation command to be transmitted to the other lens apparatus. The process proceeds to step S107.

In step S106, the control source information output unit 1014 outputs the priority table for slave driving state as the control source information, and the driving command determination unit 1012 determines the driving command based on the information. The process proceeds to step S107. In step S107, the driving mechanism 1001 drives the focus lens 1002 in accordance with the driving command, and the process is finished.

As described, if the focus lens is in the slave driving state, the priority table is switched to raise the priority of the operation command from the other lens apparatus. This can prevent a situation in which only the focus lens 1002 in the slave driving state is driven in accordance with the operation command from an apparatus other than the other lens apparatus, and the movements of two lens apparatuses are different.

Although two types of priority tables are used in the embodiment, a priority switching unit not illustrated may be arranged to set the priority of the operation commands from part of the control sources higher than the priority of the other lens apparatus in the slave driving state.

The same function can be realized using a method of disabling the operation command from a specific control source in one priority table if the state is determined to be the slave driving state. For example, equivalent functions are used in the stand-alone/master drive state and the slave drive state as in a priority table illustrated in Table 4. In the slave drive state, a command from the camera, an operation command from the demand, a termination command from the demand, and an operation command from the normal AF, i.e. control commands other than the control commands from the other lens apparatus, are disabled to drive the focus lens based on the driving commands in different priority orders while basically using the same priority table.

TABLE 4

| Priority Order | Stand-Alone/Master Drive State | Slave Drive state |
|---|---|---|
| High | Camera Demand: Operation Command | <Disabled> <Disabled> |
| ↑ | Other Lens: Operation Command | Other Lens: Operation Command |

TABLE 4-continued

| Priority Order | Stand-Alone/Master Drive State | Slave Drive state |
|---|---|---|
| ↓ | AF: Normal AF AF: AF Within Predetermined Range From Command Position | AF: Normal AF AF: AF Within Predetermined Range From Command Position |
| Low | Demand: Termination Command Other Lens: Termination Command | <Disabled> Other Lens: Termination Command |

As a result, the highest three in the priority table of Table 3 remain in the slave drive state of Table 4, and an equivalent function as the embodiment can be realized. The setting allows processing a desired driving command with just one priority table. Although the driving command from the other lens apparatus is in the list of the priority order in the stand-alone drive state and the master drive state as illustrated in Table 4, the driving command is not input from the other lens apparatus, and the lens apparatus is not driven in accordance with the driving command from the other lens apparatus. Therefore, the driving command can be processed in accordance with a desired priority order in the stand-alone drive state and the master drive state even if "Other Lens: Operation Command" and "Other Lens: Termination Command" are disabled.

If a changing unit of the setting information related to the control sources is included, changes in the setting information of the disabled control sources may not be permitted. In an example of the AF function as a control source, the setting information may include setting of enable/disable and setting of the driving method, and the changing unit may include a switch. As illustrated in Table 4, changes in the setting information are not permitted when the AF function is disabled in the slave drive state. Details will be described in a second embodiment.

Second Embodiment

Figure 6:
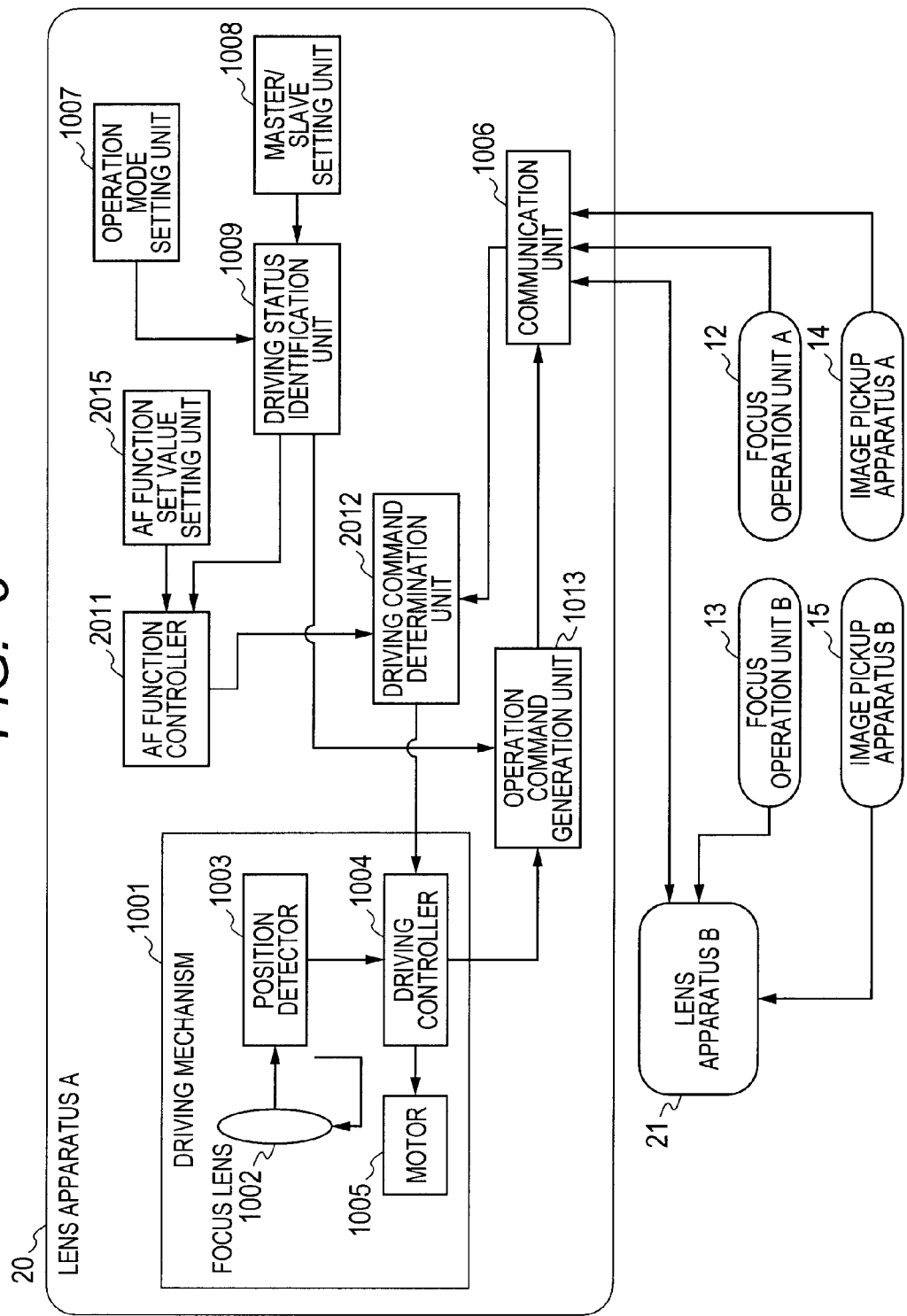
FIG. 6 is a configuration block diagram of a second embodiment.

FIG. 6 is a configuration block diagram of the second embodiment of the present invention. The image pickup system of the present embodiment includes a lens apparatus A20 and a lens apparatus B21 with the same configuration therebetween. The configuration as a camera system is the same as in the first embodiment, and the same constituent elements as in FIG. 1 are designated with the same reference numerals.

The difference in the image pickup system of the present embodiment from the configuration of the system of the first embodiment is that the control source information output unit 1014 is not included, the focus operation mechanism 1010 is not included, and an AF function set value setting unit 2015 that sets enable/disable of the AF function and an operation method is included. The AF function set value setting unit 2015 is constituted by a user interface including, for example, a switch or a switch and a display.

An AF function controller 2011 uses one or both of a phase difference signal and a video signal to generate an operation command only if the AF function is enabled and the drive is not the slave drive state in the setting of the AF function set value setting unit 2015. A driving command determination unit 2012 converts an operation command from the outside or the inside to a driving command inside the lens apparatus.

In the present embodiment, the method of determining the driving command in the driving command determination unit 2012 is the same as in the conventional lens apparatus with the stand-alone operation of the lens apparatus. Therefore, the description will be skipped.

Figure 7:
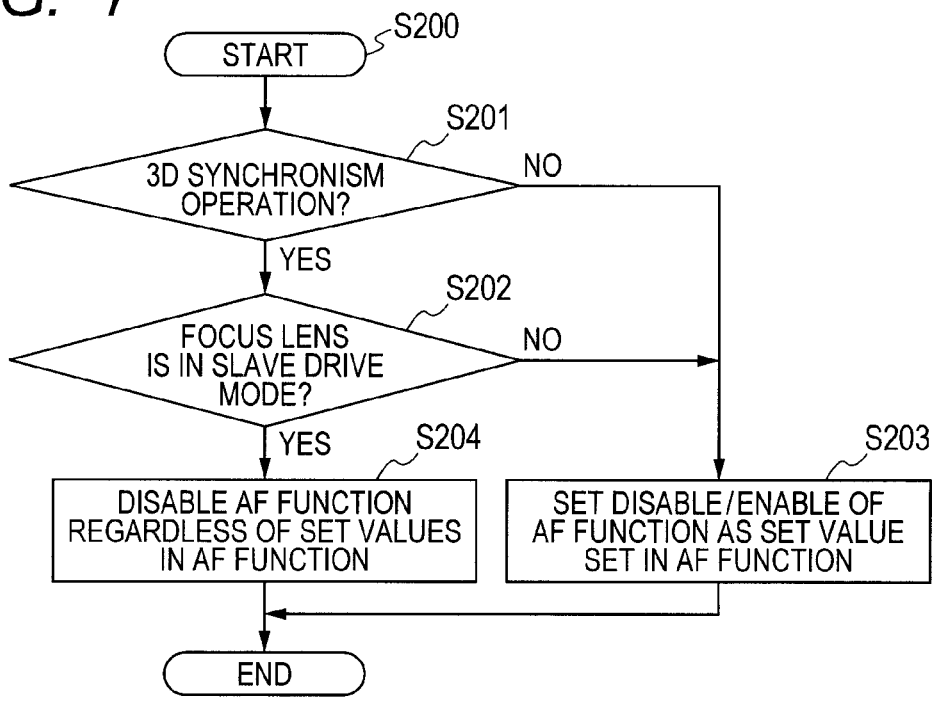
FIG. 7 is a flow chart of a process of disabling a function according to the second embodiment.

In the configuration of FIG. 6, enable/disable of AF is set in accordance with a processing flow illustrated in FIG. 7. The processing flow is started when the power is turned on or when the driving state identification unit 1009 identifies a change in the driving state.

The process is started in step S200 and proceeds to step S201.

In step S201, the driving state identification unit 1009 identifies whether the mode is the 3D synchronized operation mode. If the mode is the stand-alone operation mode, the process proceeds to step S203. If the mode is the 3D synchronized operation mode, the process proceeds to step S202. In step S202, the driving state identification unit 1009 identifies whether the focus is in the slave driving state. If the focus is the master, the process proceeds to step S203. If the focus is the slave, the process proceeds to step S204.

In step S203, the AF function controller 2011 sets the enable/disable of the AF function to the set value set in the AF function controller to allow using the AF function as in the conventional technique, and the process is finished.

In step S204, the AF function controller 2011 disables the AF function regardless of the set value set in the AF function.

As a result, the AF function is disabled in the slave, and the operation command is not input from the AF function to the driving command determination unit 2012. Disabling of the AF function is expected to reduce the power consumption inside the lens apparatus and to reduce the load of the CPU.

Figure 8:
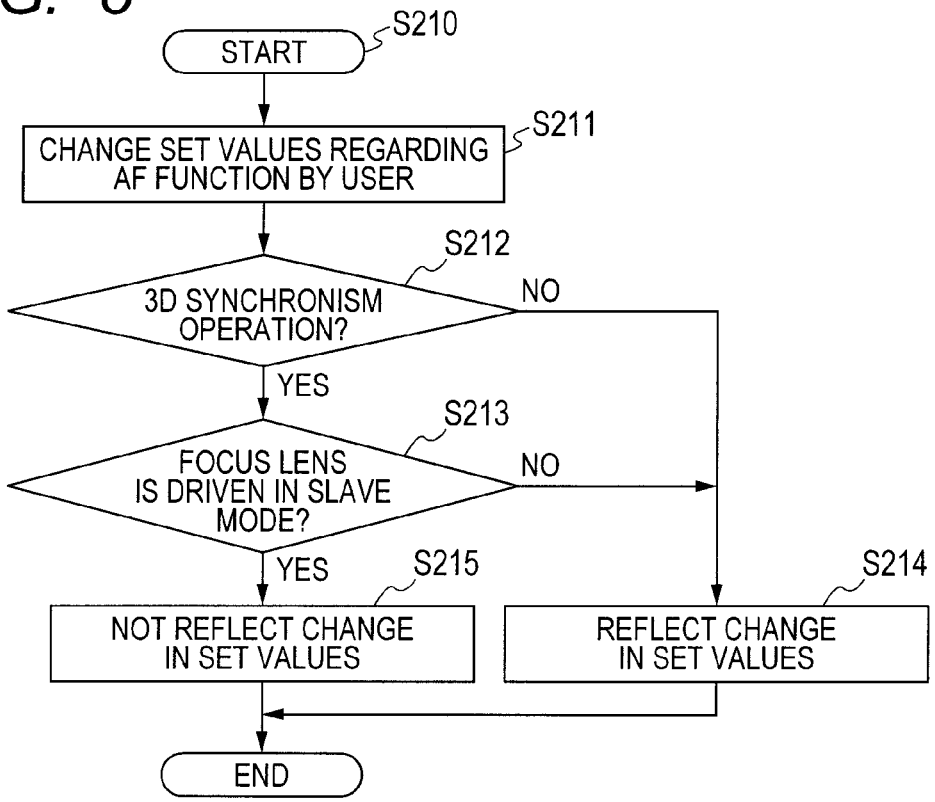
FIG. 8 is a flow chart of a process of not permitting a change in the setting according to the second embodiment.

In the configuration of FIG. 6, the setting of the AF function is changed in accordance with a processing flow illustrated in FIG. 8. The process is started in step S210 and proceeds to step S211.

In step S211, the AF function set value setting unit 2015 changes the setting related to the AF function, and the process proceeds to step S212. In step S212, the driving state identification unit 1009 identifies whether the mode is the 3D synchronized operation mode. If the mode is the stand-alone operation mode, the process proceeds to step S214. If the mode is the 3D synchronized operation mode, the process proceeds to step S213. In step S213, the driving state identification unit 1009 identifies whether the focus lens is the slave. If the focus is the master, the process proceeds to step S214. If the focus lens is the slave, the process proceeds to step S215.

In step S214, the set value set by the AF function set value setting unit 2015 is reflected on the AF function controller 2011, and the process is finished. In step S215, the set value set by the AF function set value setting unit 2015 is not reflected on the AF function controller 2011, and the process is finished.

The fact that the set value is not reflected may be reported to the AF function set value setting unit 2015, and a message indicating that the setting is not possible may be output to the user.

In this way, it is possible not to reflect the setting on the slave lens apparatus in the focus even if there is an attempt to change the setting of the enable/disable of AF or the operation method. In the present embodiment, the setting is not reflected on the slave lens apparatus even if there is an attempt to change the setting of the enable/disable of AF or the operation method. However, when there is an attempt to change the set value in the slave lens apparatus, the information related to the setting change may be transmitted to the master lens apparatus, and the change in the setting in the slave lens apparatus may be reflected on the master lens apparatus.

Consequently, the slave lens apparatus follows the drive of the master lens apparatus in which the change in the setting is reflected. Therefore, the change in the setting is reflected on the drive of the 3D system. Although an example of the AF is illustrated as a function for driving the focus lens, another example includes an automatic reproduction function for automatically reproducing the drive.

Although an example of the AF function as a function for disabling when the focus lens is the slave is illustrated in the present embodiment, other examples include the automatic reproduction function and a focus operation function not illustrated included in the lens apparatus. A focus operation command communication function as part of a function of communicating with the focus operation unit A12 and of a function of communicating with the image pickup apparatus or with a PC not illustrated can also be disabled. An advantageous effect of reducing the load of the communication can be expected by disabling the part of the communication function.

Third Embodiment

Figure 9:
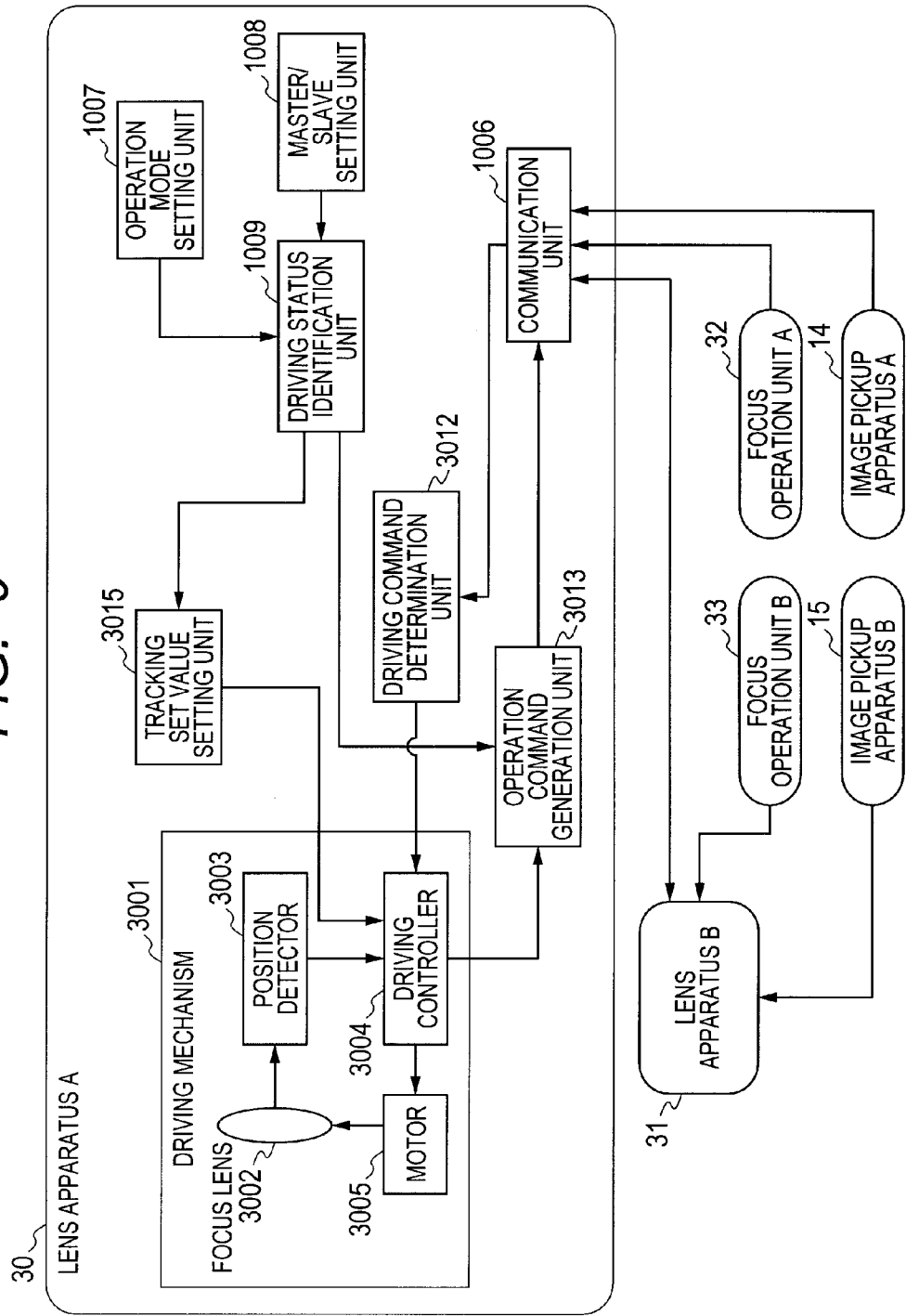
FIG. 9 is a configuration block diagram of a third embodiment.

FIG. 9 is a configuration block diagram of a third embodiment of the present invention. The image pickup system of the present embodiment includes a lens apparatus A30 and a lens apparatus B31 with the same configuration, and the same constituent elements as in FIG. 1 or 6 are designated with the same reference numerals.

Zoom operation units 32 and 33 provide zoom operation commands to the lens apparatus A30 and the lens apparatus B31, respectively. A tracking set value setting unit 3015 sets tracking information, such as enable/disable of a zoom tracking function and a tracking range, that can restrict the drive range of the zoom lens. A method of restricting the drive range of the zoom lens will be described later.

A motor 3005 moves and drives the zoom lens 3002 serving as an optical element in the optical axis direction. A position detector 3003 detects the position of the zoom lens 3002.

A driving controller 3004 calculates an amount of drive of the motor 3005 based on a driving command from a driving command determination unit 3012 described later and a position signal from the position detector 3003 and outputs a drive current corresponding to the amount of drive to the motor 3005. The driving controller 3004 has a function of limiting the drive range in accordance with the tracking information from the tracking set value setting unit 3015. The zoom lens 3002, the motor 3005, the position detector 3003, and the driving controller 3004 constitute a driving mechanism 3001.

The driving command determination unit 3012 converts an operation command from the outside or inside to a driving command inside the lens apparatus. In the present embodiment, the method of determining the driving command in the driving command determination unit 3012 is the same as in the conventional lens apparatus with stand-alone operation. Therefore, the description will be skipped.

An operation command generation unit 3013 generates an operation command for synchronizing and controlling the zoom lens of the other lens apparatus and outputs the operation command to the other lens apparatus. The information of the driving command of the zoom lens 3002 included in the driving controller 3004 and the present position information of the zoom lens 3002 detected by the position detector 3003 are used to generate the operation command of the operation command generation unit 3013.

An advantageous effect of the present embodiment will be described with reference to FIGS. 10A to 10C.

A position P is a position of the zoom lens 3002 of the lens apparatus set to the master for the zoom lens, and the lens apparatus set to the master outputs an operation command to the other lens apparatus to drive the zoom lens to the position P. In FIGS. 10A to 10C, S11 and S12 illustrate a wide-angle end and a telephoto end, respectively, as ends of the wide-angle side and the telephoto side of the zoom lens of the lens apparatus in which the zoom lens is set to the master. Similarly, S21 and S22 illustrate a wide-angle end and a telephoto end, respectively, of the zoom lens in the lens apparatus in which the zoom is set to the slave. T11 and T12 denote tracking ends of the wide-angle side and the telephoto side, respectively, in which the zoom lens is set to the master lens apparatus. If the tracking function is enabled, the zoom lens 3002 cannot be driven to the wide-angle side beyond T11 and to the telephoto side beyond T12. Similarly, T21 and T22 denote tracking ends of the wide-angle side and the telephoto side in which the zoom lens is set to the slave lens apparatus.

FIG. 10A illustrates a drive range R1 of the zoom lens in the lens apparatus in which the zoom lens is the master. The tracking ends T11 and T12 are set, and the tracking function is enabled. FIG. 10B illustrates a drive range R2 of the zoom lens in the lens apparatus in which the zoom lens is set to the slave as in the prior art. The tracking ends T21 and T22 are set, and the tracking function is enabled. FIG. 10C illustrates a drive range R3 of the zoom lens in the lens apparatus in which the zoom lens is the slave, wherein the tracking ends T21 and T22 are set, and the tracking function is disabled as in the present embodiment.

In FIG. 10B, since the tracking ends are set and the function is enabled as in the prior art, the zoom lens 3002 of the lens apparatus set to the slave in the zoom cannot be driven to the wide-angle side beyond T21. Therefore, the zoom lens 3002 cannot be driven to the position P and is terminated at the portion of the tracking end T21. Thus, as illustrated in FIG. 10C, the tracking function can be disabled when the lens apparatus is determined to be the slave to drive the zoom lens 3002 to the position P.

In this way, the synchronized drive of the master and the slave is possible.

In the configuration of FIG. 9, a process of whether to adapt the tracking function to the driving command is executed in accordance with a processing flow illustrated in FIG. 11.

The process is started from step S300 and proceeds to step S308. In step S308, the driving command determination unit 3012 determines the driving command, and the process proceeds to step S101. In step S101, the driving state identification unit 1009 identifies whether the mode is the 3D synchronized operation mode. If the mode is the stand-alone operation mode, the process proceeds to step S302. If the mode is the 3D synchronized operation mode, the process proceeds to step S103. In step S302, the driving controller 3004 restricts the driving command within the tracking range based on the tracking information set from the tracking set value setting unit 3015, and the process proceeds to step S107.

Meanwhile, in step S103, the driving state identification unit 1009 identifies whether the focus lens is set to the slave. If the focus lens is set to the master, the process proceeds to step S304. If the focus lens is set to the slave, the process proceeds to step S306. In step S304, the driving controller 3004 restricts the driving command within the tracking range based on the tracking information set from the tracking set value setting unit 3015, and the process proceeds to step S105. In step S105, the operation command generation unit 3013 generates and outputs an operation command to be transmitted to the other lens apparatus. The process proceeds to step S107.

In step S306, the function of the tracking set value setting unit 3015 is disabled, and the driving controller 3004 does not change the driving command. The process proceeds to step S107.

In step S107, the driving mechanism 3001 drives the zoom lens in accordance with the driving command, and the process is finished.

This can prevent a situation in which the drive range is limited, for the operation command from the other lens apparatus set to the master, by the zoom tracking function set to the slave lens apparatus, and the movements of two lens apparatuses are different.

As in the second embodiment, a change in the setting information related to tracking may not be permitted if the lens apparatus is set to the slave.

Examples of the function of limiting the range of the drive such as tracking include an F-Hold function in which a limit is set to the zoom position on the telephoto side to maintain predetermined brightness and an end adjustment function in which the portion of the drive end is adjusted. Similar advantageous effects can be obtained for a function of limiting the drive speed, such as a maximum speed limit and a minimum speed limit, and a function of limiting the gain of the drive, such as movement start characteristics and termination characteristics.

The present invention has been illustrated and described with the first, second and third embodiments. Derived forms of the embodiments of the present invention will be illustrated here.

The optical element is a focus lens or a zoom lens in the examples described in the first to third embodiments. Depending on the embodiment, the same advantageous effects can be obtained even if the focus lens and the zoom lens are replaced, an IE (extender) lens is inserted to and removed from an optical path, or the micro lens and the optical element are replaced by an iris mechanism, an IS mechanism (image stabilization mechanism and image stabilization function), or angle of convergence adjustment mechanism. Although the AF has been illustrated as an example of the function of automatically driving the focus lens, another example includes an automatic reproduction function. Examples of the function for automatically driving the zoom lens include an angle-of-field correction function and an automatic reproduction function (shot function for moving to a stored zoom position or a preset function of reproducing the stored movement of the zoom). Examples of the function of automatically driving the iris mechanism include iris correction and close detection. The iris correction and the close detection will be simply described here.

The iris correction function is a function of driving the iris to compensate the darkened brightness to compensate the light falloff due to an insertion of an extender lens. If the iris correction function is enabled and the extender lens is inserted, there is a problem that when a command equivalent to the close of the iris is input, the iris is driven to a position for correcting the brightness in response to the command equivalent to the close, and the iris is not closed. Thus, the close detection function is a function of closing the iris without performing the correction by the iris correction function if a command equivalent to the close is input to the iris.

Other than the setting from the operation mode setting unit 1007, the driving state identification unit 1009 may use the fact of whether the communication unit 1006 is connected to the lens apparatus B11 to identify whether the mode is the stand-alone operation mode or the 3D synchronized operation mode. Similarly, if the driving state identification unit 1009 identifies that the mode is the 3D synchronized operation mode, the driving state identification unit 1009 may automatically identify the slave driving state or the master driving state based on the driving state of the operation unit of the connected optical element or of other optical elements or based on the driving state of the lens apparatus B11.

Figure 12:
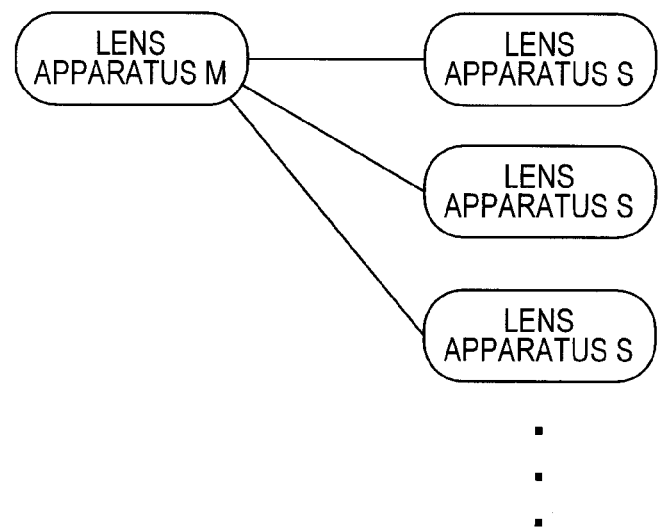
FIG. 12 is a configuration image diagram of an image pickup system including one master apparatus and a plurality of slave apparatuses.

Although the 3D synchronized imaging by two lens apparatuses has been illustrated this time as an example of the operation by a plurality of lens apparatuses, an operation on a multipoint image pickup system by two or more lens apparatuses is also possible. As illustrated in FIG. 12, an example of the method includes a multipoint imaging system in which one lens apparatus set to the master (lens apparatus M) and a plurality of lens apparatuses set to the slave (lens apparatuses S) are connected. According to the method, all slave lens apparatuses follow one master lens apparatus, and synchronized imaging is possible in all lens apparatuses.

Figure 13:
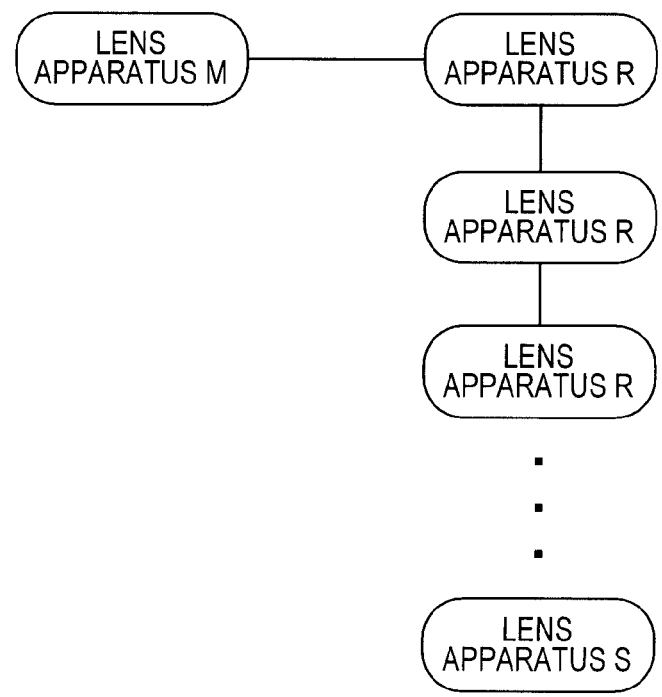
FIG. 13 is a configuration image diagram of an image pickup system connecting one master apparatus and a plurality of slave apparatuses in series.

As illustrated in FIG. 13, another example of the method includes a multipoint image pickup system in which one lens apparatus set to the master (lens apparatus M) is at the top, and a plurality of lens apparatuses (lens apparatuses R and lens apparatus S) are connected in series. In addition to the stand-alone operation mode, the master driving state, and the slave driving state, the method may include a synchronized relay operation mode for driving based on an operation command from another lens apparatus and issuing an operation command to yet another lens apparatus. In FIG. 13, in the lens apparatuses set to the synchronized relay operation mode (lens apparatuses R), the control source information output units execute similar processes as in the slave driving state, and the operation command generation units output, without a change, the received operation commands from other lens apparatuses. The lens apparatus at the end connected in series is the lens apparatus set to the slave (lens apparatus S). In this way, the lens apparatus of the present invention in the derived forms of the embodiments of the present invention can be applied to the multipoint image pickup system including a plurality of lens apparatuses connected in series with the master lens apparatus at the top.

Although the lens apparatus has been described in the embodiments, similar advantageous effects can be attained in an image pickup system including the lens apparatus.

Although the exemplary embodiments of the present invention have been described, the present invention is not limited to the embodiments, and various modifications and changes can be made within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-077651, filed on Mar. 31, 2011, which is hereby incorporated by reference herein in its entirety.

What is claimed is:

1. A lens apparatus system comprising:
a plurality of lens apparatuses each comprising:
at least one optical element drivable in accordance with control commands from a plurality of control sources, including another lens apparatus among the plurality of lens apparatuses;
a communication unit configured to communicate with the another lens apparatus;
a driving state setting unit configured to set each of the at least one optical elements of the plurality of lens apparatuses to one of a master driving state or a slave driving state;
a driving state identification unit configured to identify the driving state set to each of the at least one optical elements of the plurality of lens apparatuses;
a control source information output unit configured to output, for each driving state of each of the at least one optical elements of the plurality of lens apparatuses, control source information that specifies a priority order to be used to preferentially select a control command from a control source having a higher priority order among control commands from the plurality of control sources; and
a command determination unit configured to determine a control command for controlling drive of the corresponding at least one optical element based on the control source information output from the control source information output unit,
wherein the communication unit outputs, when driving the optical element set to the master driving state, a control command for the corresponding at least one optical element of the another lens apparatus,
wherein in the slave driving state, the control source information output unit outputs control source information that is different from the control source information in the master driving state to the command determination unit, and
wherein control command output from the another lens apparatus in the master driving state has a highest priority among the control source information.

2. The lens apparatus system according to claim 1, wherein in the slave driving state, the control source information output unit disables the control commands other than the control commands from other lens apparatuses in the control source information.

3. The lens apparatus system according to claim 1, wherein in the slave driving state, the control source information output unit disables the control commands from specific control sources of the at least one optical elements of the plurality of lens apparatuses in the control source information.

4. The lens apparatus system according to claim 2, further comprising:
a setting changing unit that changes setting information related to one or more control sources of the plurality of control sources,
wherein in the slave driving state, a change in the setting information related to disabled control sources by the setting changing unit is not permitted.

5. The lens apparatus system according to claim 1, wherein the at least one optical element includes a zoom lens that changes an angle of field, a focus lens that adjusts a focus, an image stabilization mechanism, an iris, an extender lens inserted to and removed from an optical path, and a micro lens.

6. An image pickup system comprising:
at least one external lens apparatus;
a lens apparatus including optical elements drivable in accordance with control commands from a plurality of control sources, including the at least one external lens apparatus;
a communication unit configured to communicate with the external lens apparatus;

a driving state setting unit configured to set each of the at least one optical elements of the plurality of lens apparatuses to one of a master driving state or a slave driving state;

a driving state identification unit configured to identify the driving state set to each of the at least one optical elements of the plurality of lens apparatuses;

a control source information output unit configured to output, for each driving state of each of the at least one optical elements of the plurality of lens apparatuses, control source information that specifies a priority order to be used to preferentially select a control command from a control source having a higher priority order among control commands from the plurality of control sources; and a command determination unit configured to determine a control command for controlling drive of the corresponding at least one optical element based on the control source information output from the control source information output unit, wherein the communication unit outputs, when driving the at least one optical element set to the master driving state, a control command for the corresponding at least one optical element of the external lens apparatus, wherein in the slave driving state, the control source information output unit outputs control source information that is different from the control source information in the master driving state to the command determination unit, and wherein a control command output from the external lens apparatus in the master driving state has a highest priority among the control source information.

* * * * *